Dec. 30, 1952     R. P. L. HYTTE     2,623,736
PLATE TYPE PASTEURIZER

Filed Sept. 18, 1947     2 SHEETS—SHEET 1

INVENTOR.
ROBERT PONTUS LARSSON HYTTE
BY
Davis, Hoxie & Faithfull
ATTORNEYS

UNITED STATES PATENT OFFICE 2,623,736

PLATE TYPE PASTEURIZER

Robert P. Larsson Hytte, Lund, Sweden, assignor to Aktiebolaget Separator, Stockholm, Sweden, a corporation of Sweden Application September 18, 1947, Serial No. 774,851
In Sweden July 3, 1944

Section 1, Public Law 690, August 8, 1946
Patent expires July 3, 1964

11 Claims. (Cl. 257—245)

This invention relates to heat exchanging through plates, and has for its object to provide an improved method and apparatus by which milk and cream separated from the milk can be pasteurized separately but simultaneously in the same plate heat exchange apparatus.

In plate heat exchangers used for pasteurizing milk and for simultaneous pasteurizing of the cream separated from the milk, the cream quantity thus being only a small part of the milk quantity, the size of the plates, are, for economical reasons, determined with a view to coping with the milk quantity, since the price of the apparatus will then be the lowest possible. The quantity of cream will then often be too small to permit pasteurizing by plates of the same size. It has therefore often been necessary to pasteurize the cream in an extra heat exchanger provided with plates of smaller size and designed for a smaller quantity of liquid. The small cream apparatus has then often been fixed to the same frame as the large apparatus for milk, which however is troublesome and expensive. In many cases it has even been necessary to pasteurize the cream in kettle-shaped flash pasteurizers provided with a stirrer, which necessitates still larger room and is more expensive.

When using heat exchange plates of the same size as those of the milk heat exchanger, it has been found that the velocity of the cream usually becomes so low that the cream burns on the plates, which makes it difficult, and often impossible, to heat the cream to the desired temperature, and is prone to give a burnt taste to the cream.

These inconveniences may be avoided if the thickness of the cream layer is reduced, i. e. the distance of the plates to the heat exchange surface of the adjacent plates is reduced.

In the case of plates made of thick plane sheet material in which channels for the liquid are milled, it is easy to obtain the reduced cream layer referred to by milling shallower channels in the cream plates than in the ordinary plates. In the case of plates pressed from thin sheet material, however, it becomes much more difficult to obtain the improvement referred to, because the pressing tools will usually have to be modified and also the moulds for the rubber packings, etc. In the following, only this last-mentioned type of pressed plates will be dealt with, which today are exclusively in use.

If the depth of the packing grooves and the height of the packings are preserved unchanged, which for many reasons is preferable, the thickness of the layer of the heating medium is increased in the same degree as the cream layer is reduced. It is true that this is often considered to be an inconvenience, which however disappears when the heating medium is steam, as is usually the case.

For a better understanding of the invention, reference may be had to the accompanying drawings, in which—

Figure 1:
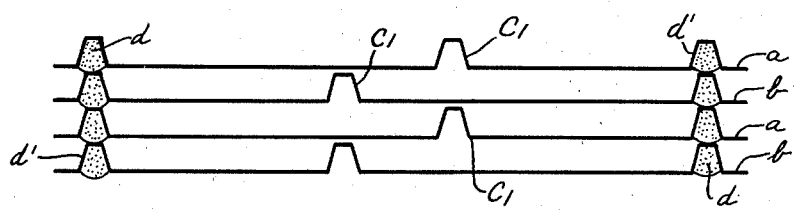
Fig. 1 is a side sectional view of a set of ordinary pressed heat exchange plates for use in heating the milk.

Referring to Fig. 1, the plates $a$ are arranged in alternation with the plates $b$, according to the usual practice, and the milk will flow separately through alternate spaces between the plates while the heating medium flows through the intervening spaces. The plates are provided with pressed lugs $c'$, each adapted to contact an adjacent plate. Soft packings $d$, made of rubber or the like, are held in pressed grooves $d'$ in the plates.

Figure 2:
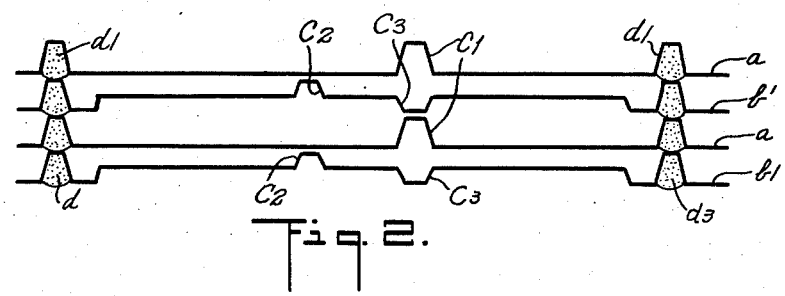
Fig. 2 is a similar view of a set of plates for heating the cream, in accordance with the invention.

The set of plates as shown in Fig. 1 is mounted in the apparatus and used to pasteurize the milk in the usual manner, but according to the invention the apparatus also includes another set of plates, as shown in Fig. 2, for pasteurizing the cream previously separated from the milk. The plates in Fig. 2 are of the same length and width as the Fig. 1 plates, but as shown in Fig. 2, each alternate plate $b'$ is provided with displaced heating surfaces, having on their one side a thinner and on their other side a thicker layer of liquid or steam. Through the thinner interspace the cream should be passed and through the thicker interspace the steam. The supporting lugs $c2$ should be lower than in the first embodiment and supporting lugs $c3$ should also be provided on the side opposite the lugs $c2$ on the plates $b1$. The other plates $a$ should preferably remain unchanged.

Figure 3:
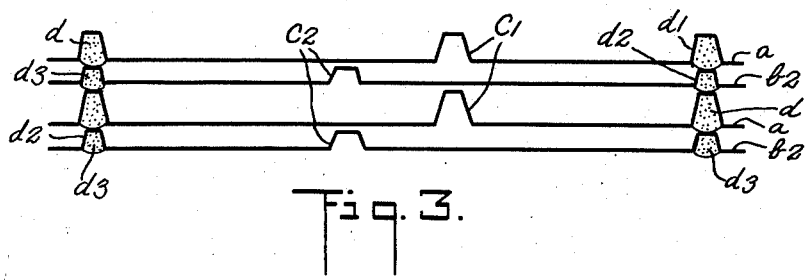
Fig. 3 is a similar view of a modified arrangement of the plates for heating the cream.

The pressed portions of the plates which are subsequently to be used as cream plates may also within the scope of the invention be made shallower, so that both the thickness of the cream layer and the height of the rubber packings and the depth of the groove for these become reduced as compared with ordinary plates. The rubber packings will then, of course, become very thin. Figure 3 shows a set of plates of this kind, the alternate plates $b2$ having a groove $d2$, packing $d3$, and lug $c2$ which are lower than on ordinary plates. The lug $c3$ need not be provided.

Figure 4:
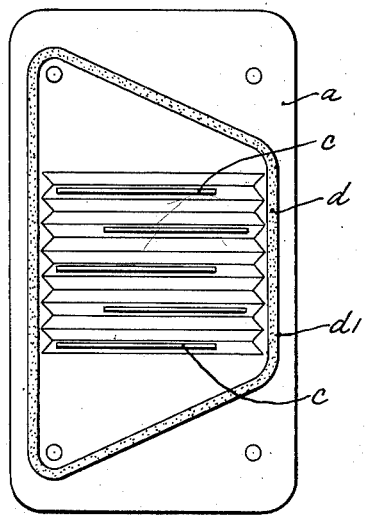
Fig. 4 is a plan view of another heat exchange plate made in accordance with the invention, for heating the cream.

Another method of avoiding these difficulties is to leave the cream layer unchanged and to divide the plate into a great number of narrow, e. g. horizontal, channels through which the cream flows consecutively at relatively high velocity as compared with the milk, the cross section of the channel then being only a small part of that of the original milk plate. It will be understood that the shape of the plates and preferably also the location and the shape of the packing groove and other pressed portions should be preserved. The flow across the cream plate will then be in zig-zag through narrow channels, whereas the liquid preferably passes over the milk plates (Fig. 1) in a single broad flow covering their whole breadth from the inlet to the outlet of the plates. Such sets of plates for cream pasteurizing may without inconvenience be incorporated in the milk heat exchanger and secured together with the same devices as used for the milk plates. The new channels may preferably be formed by welding on cross ribs $c$ arranged in staggered relation, the thickness of which should approximately be the same as that of the cream layer, as shown in Figure 4. The ribs $c$ may, however, also be pressed directly out of the plate.

Figure 5:
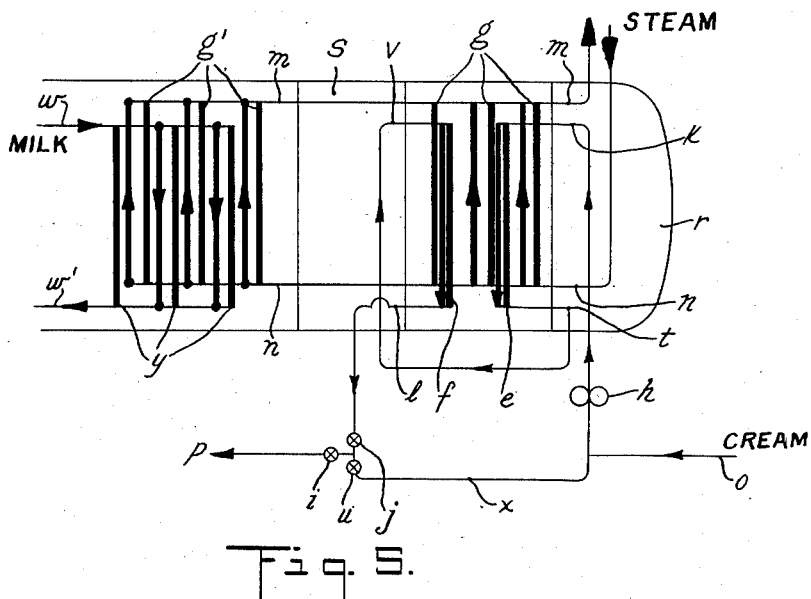
Fig. 5 is a schematic view of a system arranged according to the invention for separately but simultaneously pasteurizing the milk and the cream.

It will be understood that the fluid inlet and outlet openings in the plates heretofore described may be arranged in the conventional manner for either series or parallel flow, a parallel flow arrangement being shown by way of example in Fig. 4, and a series flow arrangement for the cream and a parallel flow arrangement for the steam being shown by way of example in Fig. 5.

The problem may also be solved in the following manner, whereby the velocity is increased and burning and consequently impaired heat transmission are prevented. An extra circulation pump $h$ and piping $x$, Figure 5, are provided and coupled to the cream heat exchanger, so as to make large quantities of cream circulate per time unit, although only a small amount of cream is supplied to the cream heat exchanger. The coupling scheme will then be as illustrated in Figure 5. Such a scheme is particularly suitable when milk is to be standardized to a lower fat content than it originally contained, because a very small amount of cream will then have to be continuously pasteurized. This scheme represents a further measure to prevent burning of the cream.

As the distance between the plates of the cream heat exchanger is here relatively great and therefore the resistance low, an extra resistance may be provided, e. g. in the form of a capillary tube, a throttling valve, etc., $i$, $j$, or $u$ in Figure 5, in the pipe behind the heat exchanger. By this means, gas blisters are prevented from forming in the cream and no boiling will occur, which could easily entail disturbances in the operation and also hinder the transmission of heat between the cream and the heating surfaces.

With a view to preventing steam and gas blisters, which may easily be formed in and carried off with the liquid to be heated, from sticking between the plates it is preferable to make the liquid flow from below upwards in the heating plates. The liquid, e. g. the cream, is then introduced at the bottom at K into a connecting plate or a pressure plate $r$, Figure 5, passes from below upwards between the plate $e$ and the plate $g$ to its left and issues at the upper part $t$, passes to the lower inlet $v$ of the next connecting plate $s$, and thence between the plate $f$ and the plate $g$ to its left from below upwards, and leaves the heating section at $l$. Steam passes between each of the plates $e$ and $f$ and the plate $g$ to its right, from above downwards, that is in counter-current to the liquid to be heated. The cream may also pass downwards in isolated plates provided for this purpose in the set of plates.

It will be apparent from Fig. 5 that I have provided a single heat exchange apparatus divided into two sections, one section for the cream and comprising the plates $e$, $f$ and $g$ forming cream channels of relatively small cross-sectional area, and the other section for the milk and comprising plates $g'$ and $y$ forming milk channels of relatively large cross-sectional area. Furthermore, it will be understood from the preceding description and the drawings, particularly Fig. 5, that the plates of these two sections are of the same size so that they can be held in a common mounting means or frame, as shown in outline $z$ in Fig. 5.

The liquid may be introduced into the circulation pipe $x$ either before or behind the circulation pump $h$. The pasteurized liquid issues through the pipe $p$. The resistance referred to may be provided at $i$, $j$, or $u$, depending on changes in the pressure at the inlet and outlet pipes $o$ and $p$, respectively.

The pipe $x$ forms a connection between the cream inlet $k$ to the cream channels and the cream outlet $l$ from these channels. The duct $o$ supplies cream to this pipe connection $x$; and the duct $p$ withdraws cream from the pipe $x$ at a rate less than the rate of flow through pipe $x$ to duct $p$, so that part of the cream from outlet $l$ is recirculated through the cream section via pipe $x$.

The steam is admitted through pipe $n$ and flows through the steam channels between the plates, as shown by the arrows, to the discharge pipe $m$. The milk is fed separately from the cream through pipe $w$ and the heat exchange plates $y$ and $g'$ (Fig. 5), where it is heated by the steam passing through channels alternating with the milk channels. The steam passes from supply pipe $n$ to the discharge pipe $m$, countercurrently to the milk, as shown by the arrows in Fig. 5. The milk is discharged through pipe $w'$. The plates $y$ and $g'$ are arranged in the usual manner, as shown in Fig. 1, for example. It will be apparent that with this arrangement the cream and milk pasteurizing operations may be effected simultaneously in the same apparatus.

I claim:

1. A plate heat exchanger for pasteurizing cream and milk, which comprises separate sections for heating the milk and the cream, respectively, each section having plates disposed in spaced relation and forming a series of channels including a channel for the heating medium adjacent to but separate from each channel for the liquid to be heated, the plates of the milk section being of the same length and width as the plates of the cream section, the plates of the cream section defining cream channels of substantially smaller cross-sectional area than the milk channels in said milk section, and inlet and outlet connections to the cream channels separate from the milk channels.

2. A plate heat exchanger according to claim 1, in which the cream channels defined by the plates in said cream section are substantially smaller in cross-sectional area than the channels for the heating medium in the cream section.

3. A plate heat exchanger according to claim 1, in which each alternate plate in the cream section has a major part of its area substantially closer to the adjacent plate on one side thereof than to the adjacent plate on the other side.

4. A plate heat exchanger according to claim 1, in which the cream section includes a plate partly defining a cream channel which is substantially longer than the milk channel between adjacent plates in said milk section.

5. A plate heat exchanger according to claim 1, in which the cream section includes a plate having staggered ribs partly defining a cream channel which is substantially longer than the milk channel between adjacent plates in said milk section.

6. A plate heat exchanger according to claim 1, comprising also a pipe line for feeding cream to said cream section, a pipe line for removing heated cream from said last section, and a pipe connection between said lines for recirculating to the cream section a part of the heated cream removed through said second pipe line.

7. A plate heat exchanger for simultaneously pasteurizing separate streams of cream and skim milk fractions of a milk product, which comprises heat exchange plates each of the same length and width as the other plates, mounting means common to said plates for mounting them in spaced relation in two sections for heating the milk and cream fractions, respectively, each section having inlet and outlet connections for receiving and discharging one of said streams and also having inlet and outlet connections for the heating medium, the plates of each section forming a series of channels including a channel for the heating medium adjacent to but separate from the channel for the fraction to be heated, the plates of the cream section forming a channel for the cream fraction which is of smaller cross-sectional area than the channel for the milk fraction formed by the other plates.

8. A plate heat exchanger according to claim 1, comprising also packing interposed between the plates of the cream section, the packing between each alternate plate of the cream section and the adjacent plate on one side thereof being of substantially greater thickness than the packing between said alternate plate and the other adjacent plate.

9. A plate heat exchanger according to claim 1, comprising also packing interposed between the plates of the cream section, each alternate plate of the cream section having a major part of its area substantially closer to the adjacent plate on one side thereof than to the other adjacent plate on the opposite side, each plate of the cream section having a depressed portion forming a recess for the packing, the depressed portion and the packing of each of said alternate plates being substantially thinner than the depressed portion and the packing of the plates adjacent thereto, said thinner depressed portion of each of the alternate plates engaging packing of said closer adjacent plate.

10. A plate heat exchanger according to claim 1, comprising also a pipe connection between said inlet and outlet connections, a duct for supplying cream to said pipe connection, and a second duct for withdrawing cream from said pipe connection at a rate less than the rate of flow through said pipe connection to the second duct, whereby part of the cream from said outlet connection is recirculated through said cream section.

11. A plate heat exchanger according to claim 1, comprising also a pipe connection between said inlet and outlet connections, a duct for supplying cream to said pipe connection, a second duct for withdrawing cream from said pipe connection at a rate less than the rate of flow through said pipe connection to the second duct, whereby part of the cream from said outlet connection is recirculated through said cream section, and an adjustable flow resistor located in said pipe connection between said outlet connection and said supply duct.

ROBERT P. LARSSON HYTTE.

REFERENCES CITED

The following references are of record in the file of this patent:

UNITED STATES PATENTS

| Number | Name | Date |
| --- | --- | --- |
| 264,516 | Cooley | Sept. 19, 1882 |
| 1,609,971 | Seligman | Dec. 7, 1926 |
| 1,770,254 | Seligman | July 18, 1930 |
| 1,801,152 | Grasse | Apr. 14, 1931 |
| 2,198,217 | Musher | Apr. 23, 1940 |

FOREIGN PATENTS

| Number | Country | Date |
| --- | --- | --- |
| 385,108 | Great Britain | Dec. 22, 1932 |
| 500,294 | Great Britain | Feb. 6, 1939 |